W. GILLARD.
CEMENT TILE MAKING MACHINE.
APPLICATION FILED APR. 2, 1921.

1,424,469.

Patented Aug. 1, 1922.
10 SHEETS—SHEET 1.

INVENTOR.
WILLIAM GILLARD.
BY

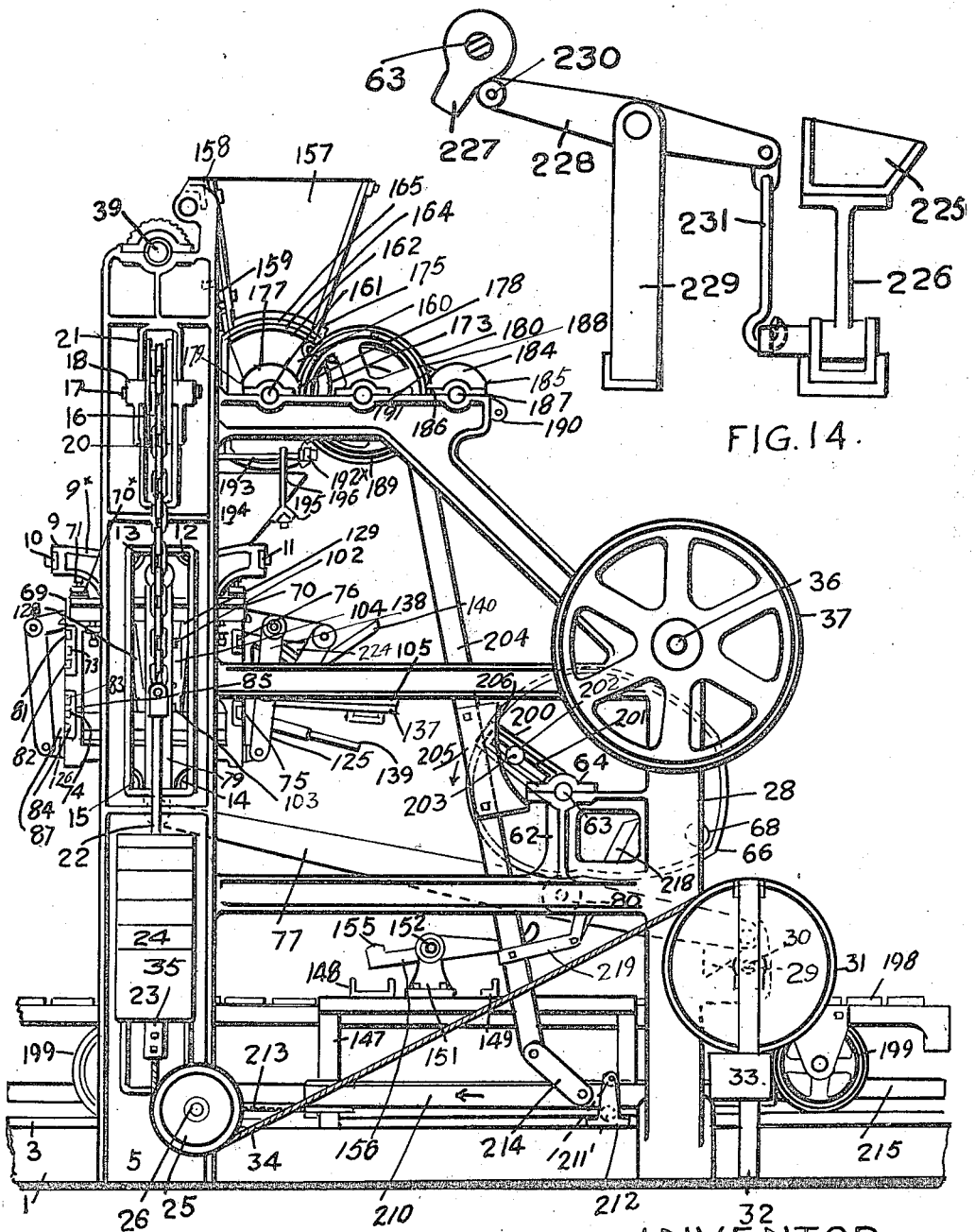

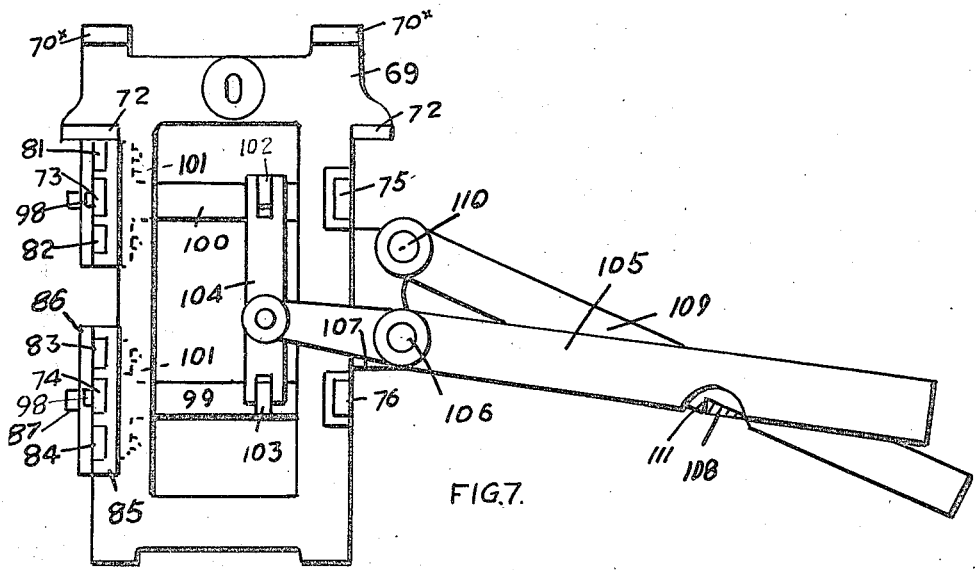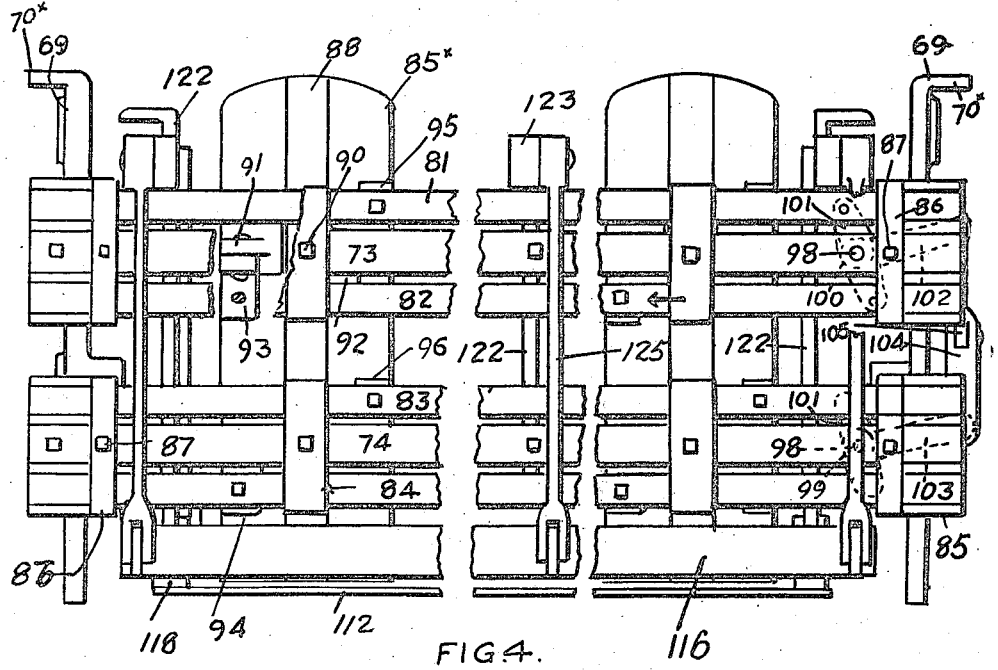

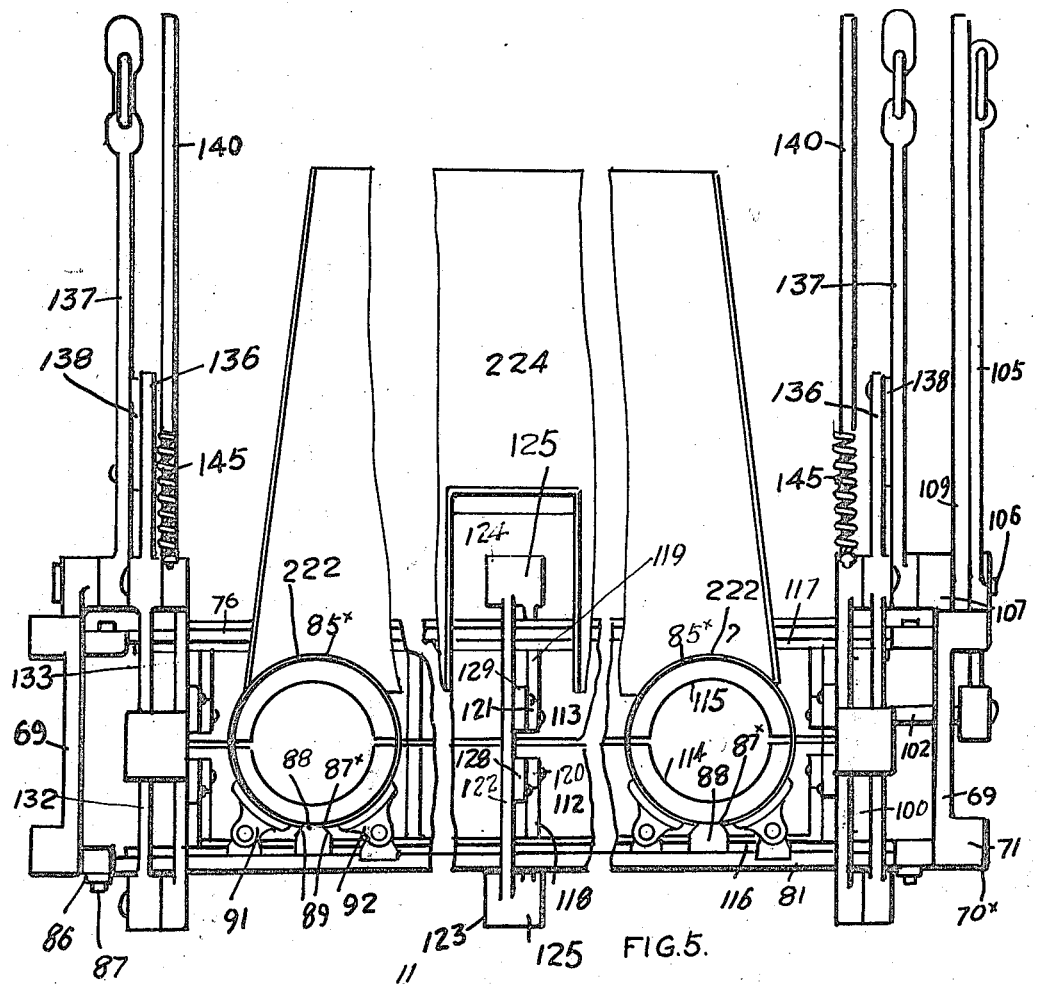
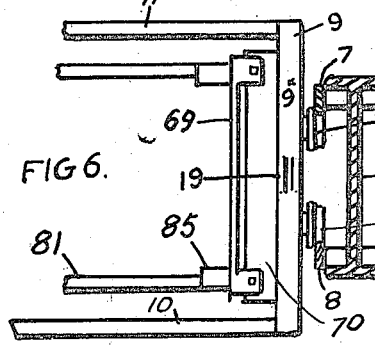

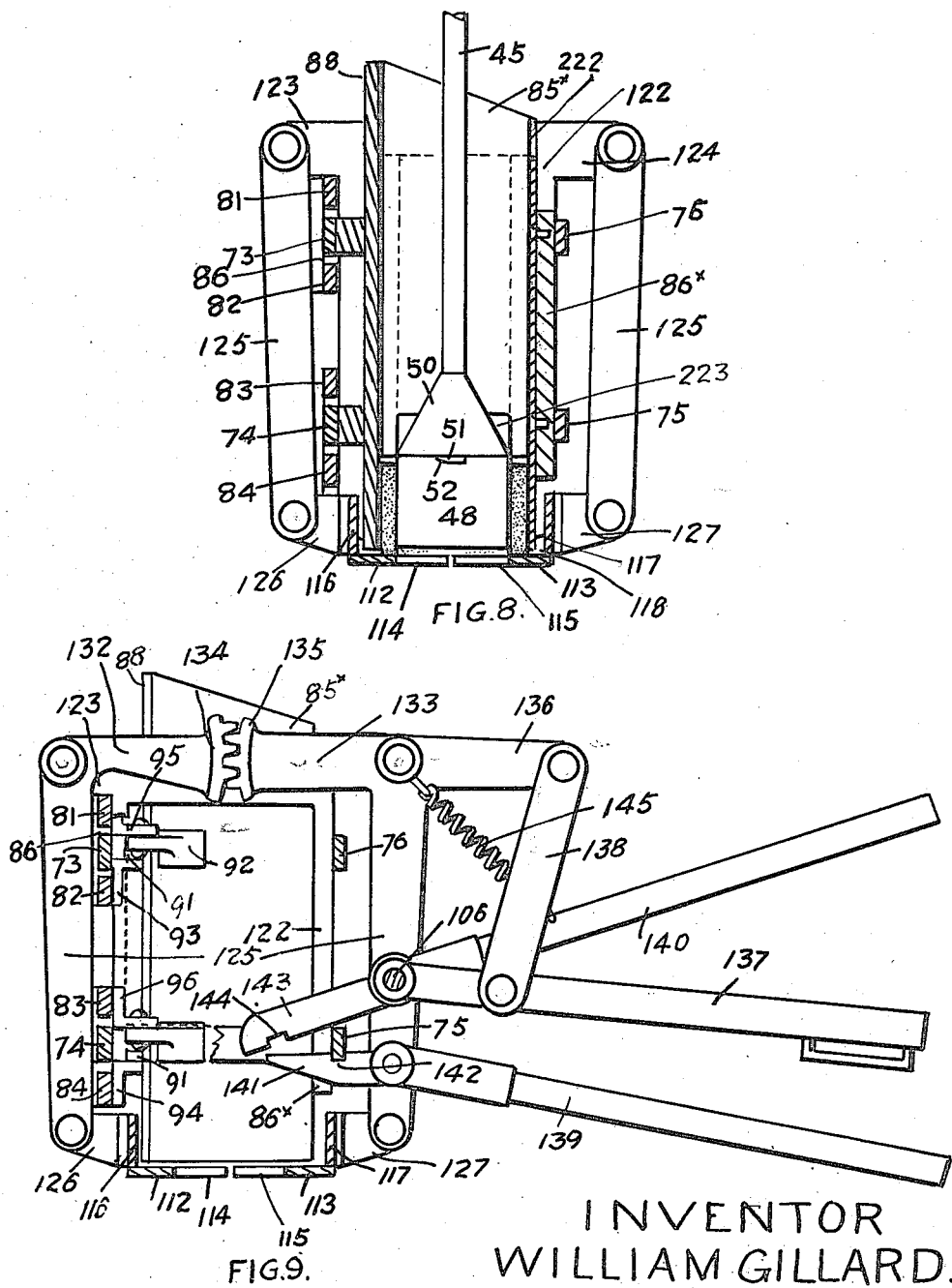

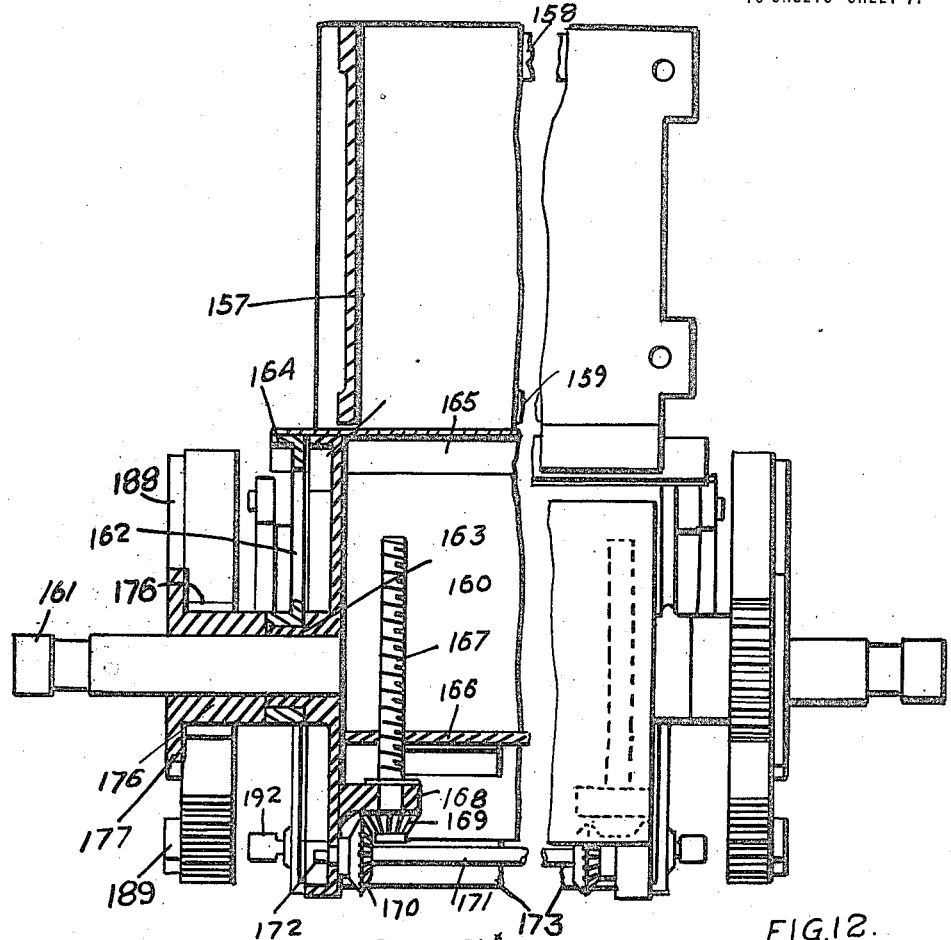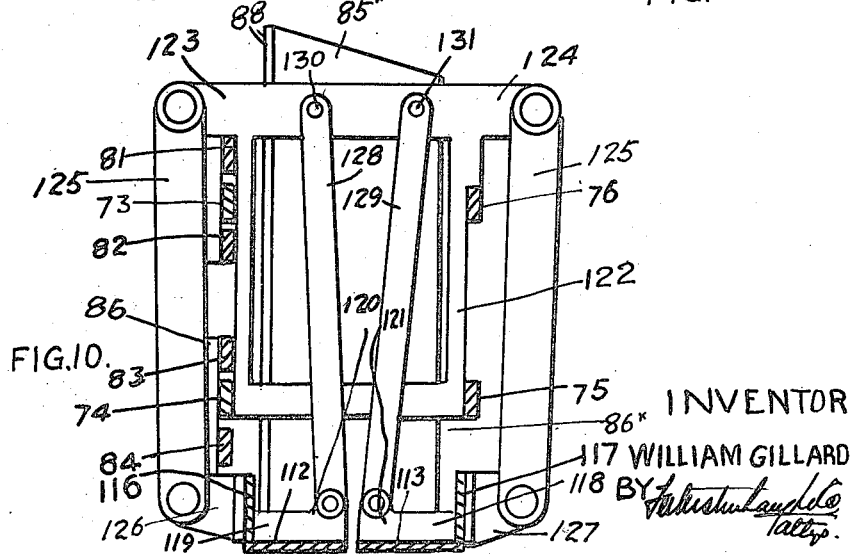

W. GILLARD.
CEMENT TILE MAKING MACHINE.
APPLICATION FILED APR. 2, 1921.
1,424,469.
Patented Aug. 1, 1922.
10 SHEETS—SHEET 8.
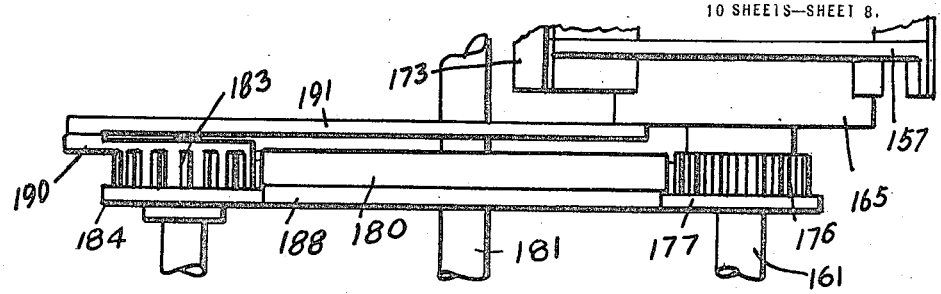
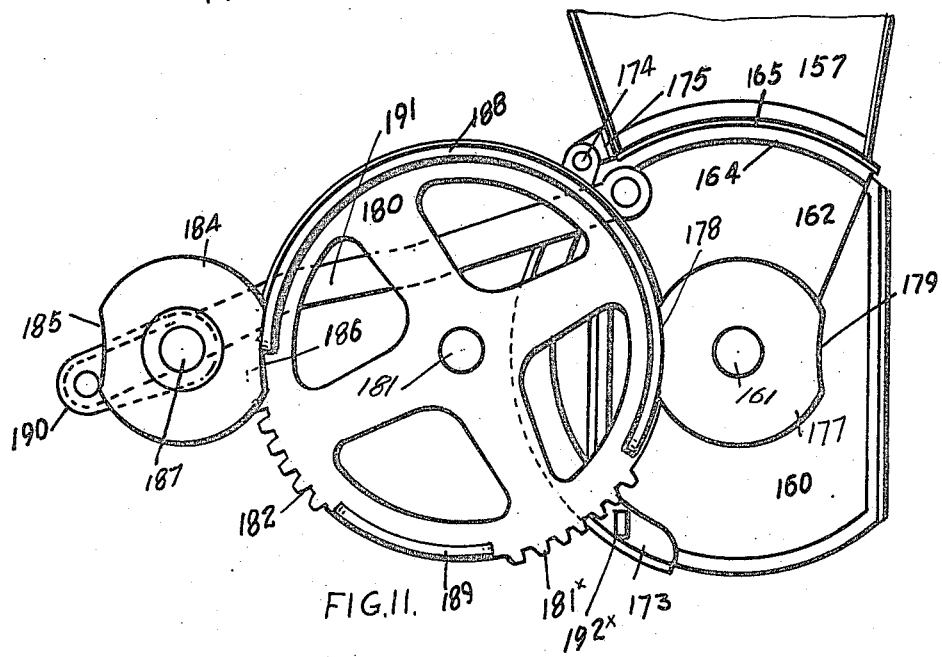
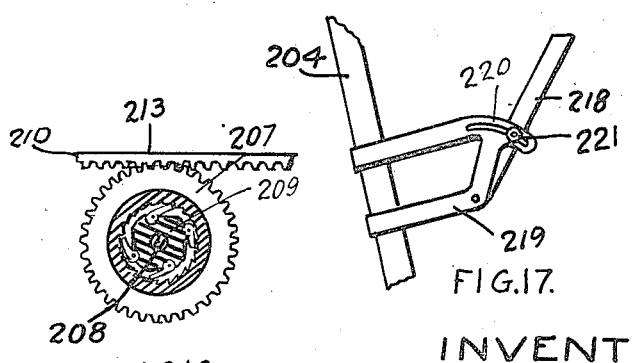
INVENTOR.
WILLIAM GILLARD.
BY

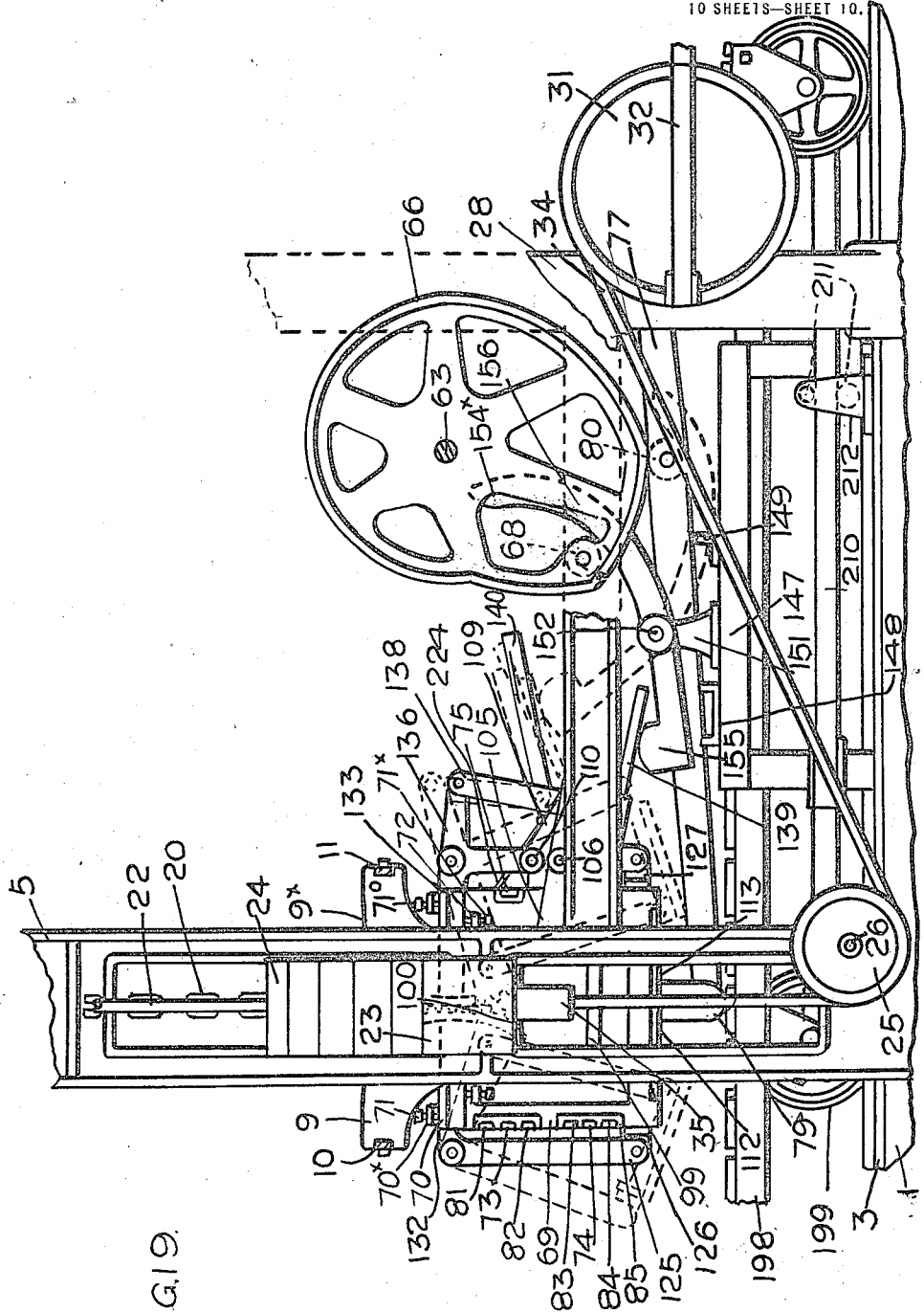

UNITED STATES PATENT OFFICE.

WILLIAM GILLARD, OF STRATFORD, ONTARIO, CANADA.

CEMENT-TILE-MAKING MACHINE.

1,424,469. Specification of Letters Patent. Patented Aug. 1, 1922.

Application filed April 2, 1921. Serial No. 457,843.

*To all whom it may concern:*

Be it known that I, WILLIAM GILLARD, of the city of Stratford, in the county of Perth, in the Province of Ontario, Canada, have invented certain new and useful Improvements in Cement-Tile-Making Machines, of which the following is the specification.

My invention relates to improvements in cement tile making machines, and the object of the invention is to devise a machine which will automatically operate to form a cement tile in such a way as to prevent the marring and cracking of the tile, and also so constructed that the density of the compressed material will be equal throughout the tile and it consists essentially of the following arrangement and construction of parts as hereinafter more particularly explained.

Fig. 3 is a similar view to Fig. 2 looking from the right hand side of the machine and showing the parts adjacent to the right hand supporting standard of the main frame.

Fig. 4 is an enlarged front elevation of my mould carrier intermediately broken away of its length.

Fig. 5 is a plan view of the part shown in Fig. 4.

Fig. 6 is a detail plan of the mould carrier and vertically movable mould carrier support showing the standard of the main frame and guides carried thereon in section.

Fig. 7 is an end elevation of the mould carrier showing the levers and mechanism for opening and closing the moulds.

Fig. 8 is a vertical section through the mould carrier and mould showing a former therein in the position it assumes when forming the tile.

Fig. 9 is a sectional view through the mould carrier and swinging plates forming the divided mould bottom and the operating and locking levers therefor.

Fig. 10 is a sectional view through the mould carrier showing the means for swingably supporting the plates forming the divided bottom of the mould and showing the mould in position.

Fig. 11 is a side elevation of the cement measurer and the operating mechanism thereof.

Fig. 12 is a longitudinal sectional view through the cement measurer and operating mechanism, the parts being broken away intermediately of their length.

Fig. 13 is a plan view of the gearing and mechanism operating the cement measuring device.

Fig. 14 is a detail of my spill trough and means for swinging the same.

Fig. 15 is an elevation of the parts shown in Fig. 14 looking from the direction at right angles to the view shown in Fig. 14.

Fig. 16 is a sectional detail of the clutch mechanism taken on line 16—16 Fig. 1.

Figure 18:
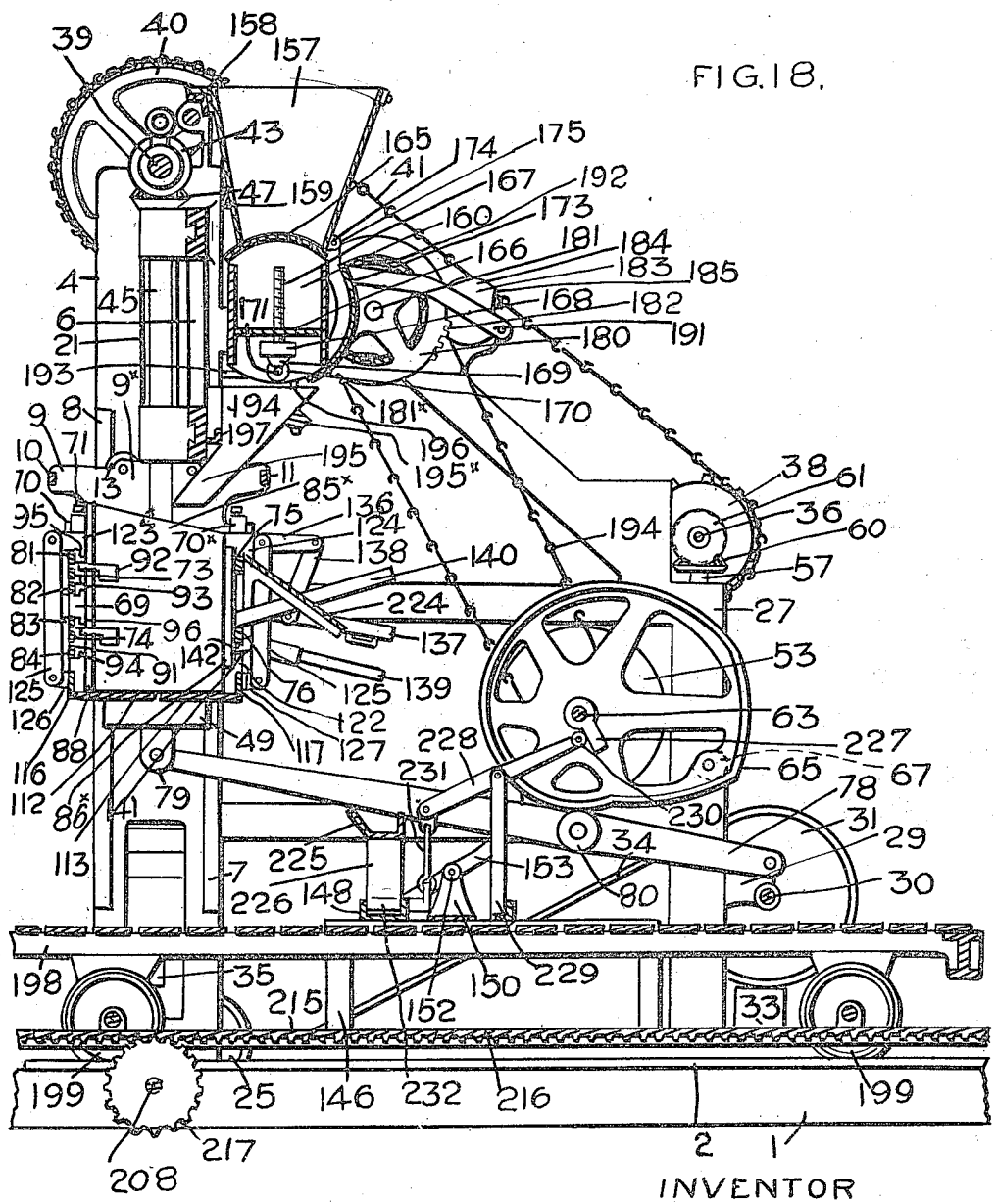

Fig. 17 is a detail of an adjustable cam bar. Fig. 18 is a sectional view through the centre portion of my machine. Fig. 19 is an enlarged detail elevation showing the mechanism in the tile discharging position.

In the drawings like characters of reference indicate the corresponding parts in each figure.

Figure 1:
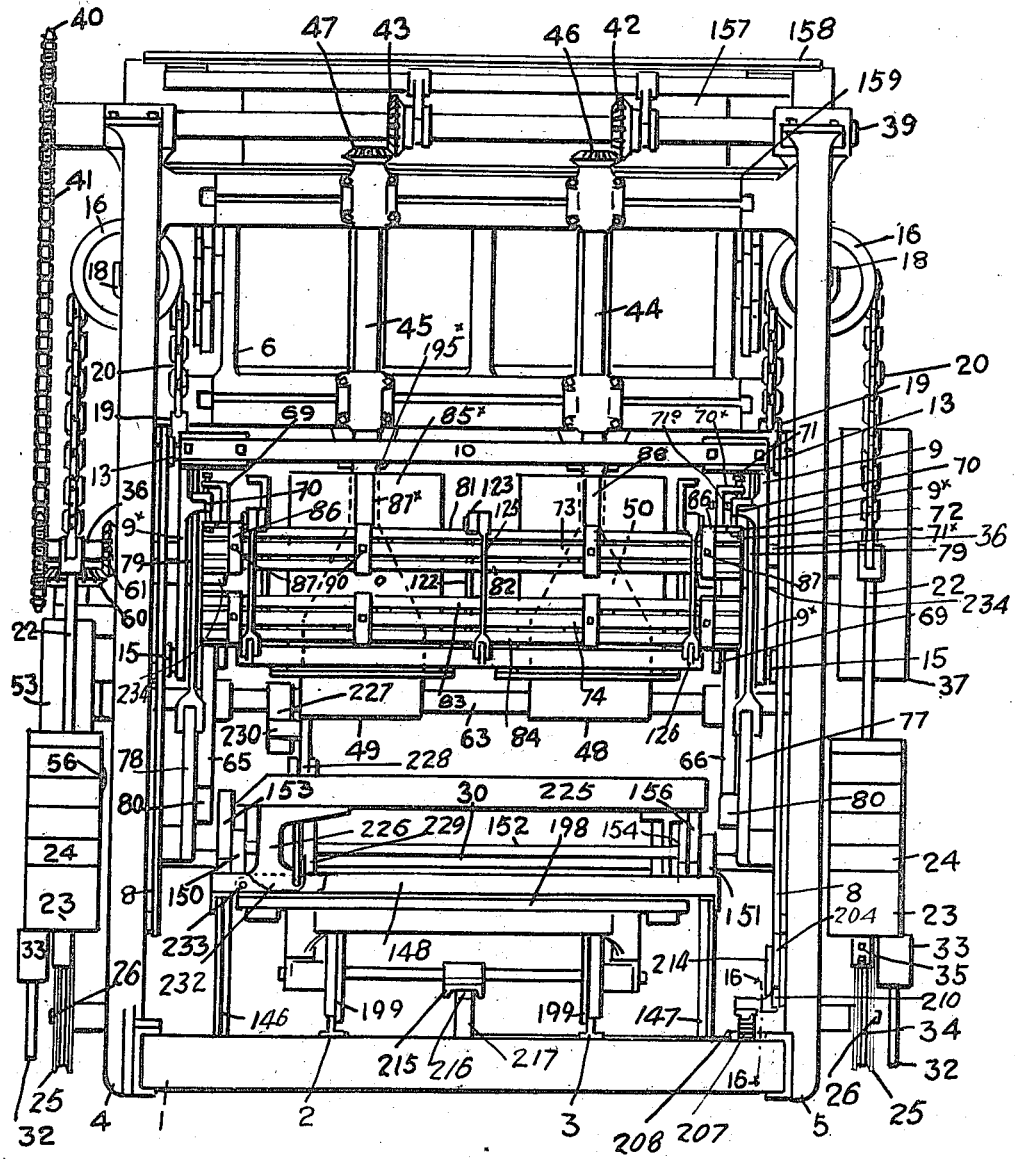
Fig. 1 is a front elevation of my machine.
Figure 2:
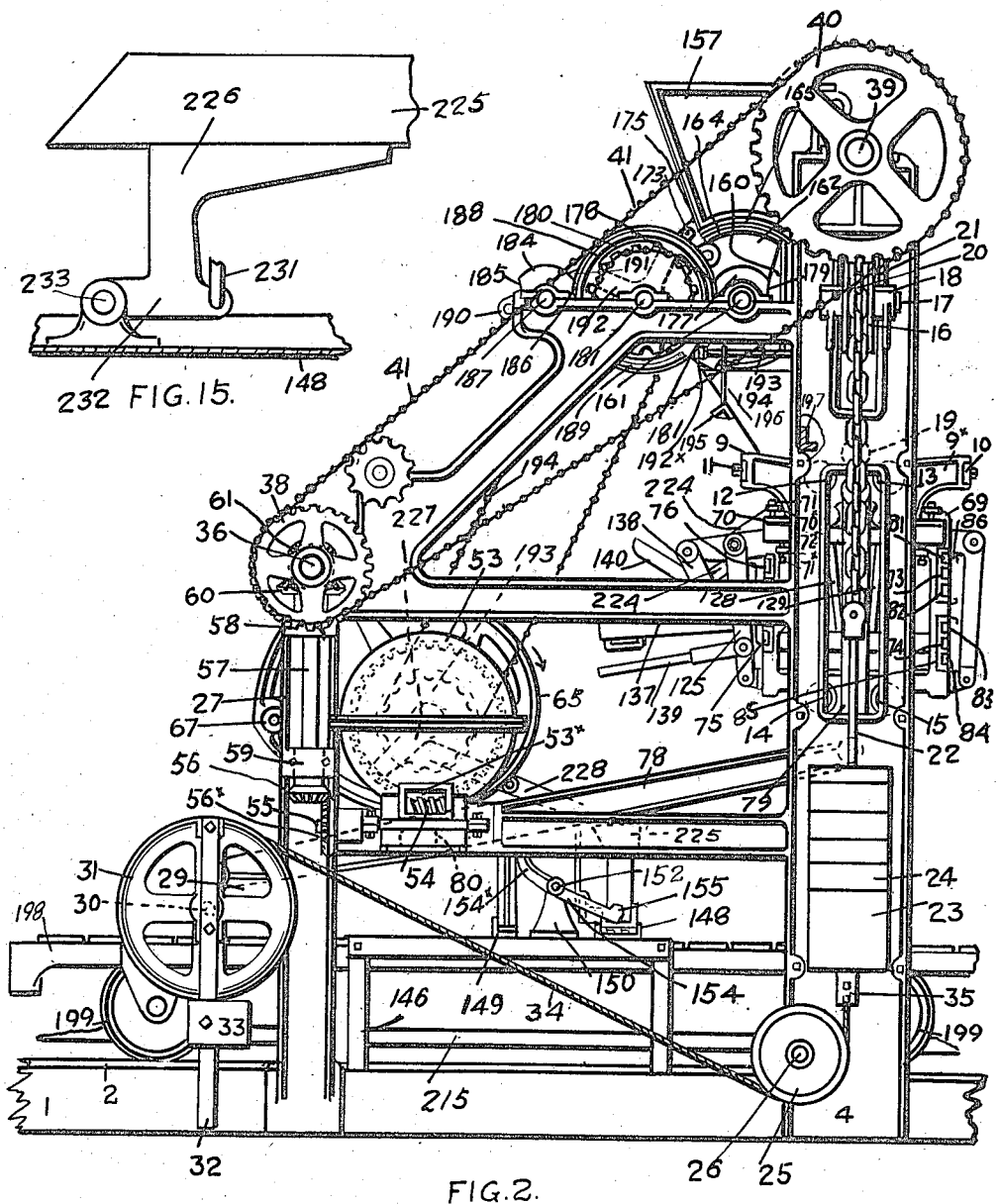
Fig. 2 is a side elevation looking at the left hand side of the machine and at the parts adjacent to the left hand standard of the main frame of the machine.

1 indicates the base frame of my device. 2 and 3 are rails carried by the base frame. 4 and 5 are vertical standards secured to the base frame at their lower ends and extending upwardly therefrom. The standards 4 and 5 are connected together intermediately of their height by a cross frame 6. 7 and 8 are guide bars secured to the standards 4 and 5. Each standard 4 and 5 carries a pair of opposing guide bars 7 and 8 which are suitably spaced from the standard as clearly indicated in Fig. 6. 9 is a mould carrier support. 9× are the end frames of the mould carrier support, a frame 9× being located in proximity to the inner face of each standard 4 and 5. The frames 9× are connected together at their upper end by bars 10 and 11. 12, 13, 14 and 15 are flanged rollers mounted upon the frames 9×, a pair of rollers 13 and 15 bearing against the inner edge of the guide bar 8 and a pair of rollers 12 and 14 bearing against the opposing edge of the guide bar 7. By this means the mould carrier support is guided to move vertically between the standards 4 and 5. 16 are flanged wheels mounted on axles 17 carried by bearings 18 mounted upon each standard 4 and 5. 19 is a lug extending upwardly from the upper edge of each end frame 9×. 20 are chains. A chain 20 is secured at one end to each lug 19 and extends upward therefrom over and around the flanged wheels 16 depending from such flanged wheels on the outside of each standard 4 and 5. 21 are slotted openings formed in the standards 4 and 5 to permit of the passage of the chains 20. A rod 22 is secured to each depending end of the chains 20 and carries at its lower end a counter weight 23. Upon each counter weight are mounted a series of removable weights 24. 25 is an idler pulley mounted on a stud 26 extending from the standards 4 and 5. The standards 4 and 5 are provided with rearward extensions 27 and 28. 29 are brackets extending from each extension 27 and 28. 30 is a shaft journalled in the brackets 29 and upon which are secured grooved wheels 31. 32 is a counter weight bar secured to each wheel 31 and extending diametrically thereof and in its normal position vertically. 33 is a counter weight adjustably secured to the bar 32. 34 is a cord. A cord 34 is secured at one end to the periphery of each of the wheels 31 and to the upper portion thereof, such cord extending downward from the wheel 31 around and beneath the idler wheel 25. The opposite end of each cord 34 is connected to a depending lug 35 forming part of the main counter weight 23. 36 is a main driving shaft of the machine mounted in bearings carried by the extensions 27 and 28 of the standards 4 and 5. 37 is a driving pulley secured to the shaft 36 at one end. 38 is a sprocket wheel secured to the opposite end of the driving shaft 36. 39 is a shaft mounted in bearings carried upon the upper end of the standards 4 and 5. 40 is a sprocket wheel secured to the shaft 39 and connected by a sprocket chain 41 to the sprocket 38 hereinbefore described. 42 and 43 are bevel gears mounted upon the shaft 39 so as to rotate therewith. 44 and 45 are vertical former shafts journalled in vertical bearings carried by the cross frame 6. 46 and 47 are bevel gears secured to the upper ends of the shafts 44 and 45. The gears 46 and 47 mesh with the gears 42 and 43 and are continuously driven therefrom and directly connected to the main drive of the machine. 48 and 49 are cylindrical formers which are of the same diameter as the interior of the cylindrical tile which this machine is designed to make. The upper portion of each former 48 and 49 tapers at 50 to the diameter of its corresponding shaft 44 and 45. Each former 48 and 49 is provided at the upper end of its cylinder portion with compressor wings 51, the forward lower portion of which curves upward as indicated at 52 (see Fig. 8). The wings 51 extend radially out from the former, the outer ends of the wings corresponding to the exterior diameter of the tile or the interior diameter of the mould the construction of which I will hereinafter describe. 53 is a worm gear case containing a worm gear $53^x$ and a worm 54. The worm 54 is mounted upon the shaft 55 upon which is secured a bevel gear $56^x$. 57 is a shaft journalled in bearings 58 and 59 carried by the frame extension 27. 60 is a bevel gear secured to the upper end of the shaft 57. 61 is a bevel gear secured to the driving shaft 36, and meshing with the bevel gear 60. 62 is a bracket portion forming part of the frame extension 28. 63 is a cam shaft journalled at one end in a bearing 64 carried by the bracket portion 62 and at the opposite end in a similar bracket adjacent to the worm gear case 53, the worm gear $53^x$ being secured to the end of the shaft 63 and which shaft is driven from the main shaft 36 through the bevel gears 61 and 60, shaft 57, bevel gear 56 meshing with the bevel gear $56^x$ and through the shaft 55, worm 54 and worm gear $53^x$. 65 and 66 are cams secured to the cam shaft 63, the cams 65 and 66 being of the same shape. 67 is a roller mounted upon the cam 65 and 68 is a roller mounted upon the cam 66. The cams 65 and 66 revolve in the direction indicated by arrow (see Fig. 2).

I will now describe the construction of the mould carrier which is mounted between the end plates $9^x$ of the mould carrier support. 69 are the end frames of the mould carrier. 70 is an inwardly projecting ledge extending from each end plate 9 of the mould carrier support. $70^x$ are lugs provided with set screws 71 and $71^o$ which bear upon the ledge 70. 72 are lugs extending from each frame 69 beneath the level of the ledge 70 and provided with set screws $71^x$ bearing against the lower edge of the ledge 70. By this means the frames 69 are held from both longitudinal and vertical movement. 73 and 74 are bars rigidly secured at their ends to the end frames 69 intermediately of their height so as to space these end frames apart. The opposite sides of the frames 69 are also similarly spaced apart by bars 75 and 76.

By this means a rigid frame is provided which moves vertically with the mould carrier support 9. 77 and 78 are levers mounted at one end on the brackets 29 hereinbefore referred to. 79 are links connecting the levers 77 and 78 to corresponding end frames 69 of the mould carrier support. 80 are rollers journalled upon the levers 77 and 78 and coact with the cams 65 and 66.

It will be seen that as the cams 65 and 66 are revolved they depress the levers 77 and 78 so as to draw down the mould frame support against the pull of the counter weights 23 and 24. 81, 82, 83 and 84 are bars which are supported in the end frames 69 of the mould carrier in guides 85 so as to have slight longitudinal movement. The bars 81, 82, 83 and 84 are held in the guides by cross plates 86 which are secured by bolts 87 to the stationary bars 73 and 74. The bars 81 and 83 are actuated to move in one direction and the bars 82 and 84 in the opposite direction by mechanism and for a purpose which I will hereinafter describe. 85× are moulds. 86× are vertical bars secured to the longitudinal bars 75 and 76 of the mould carrier. The moulds 85× are secured to the vertical bars 86× and are thereby held in a stationary position within the mould frame. The opposite portion of each mould 85× is divided so as to form a vertical slotted opening 87×. 88 is a filling bar provided with beveled vertical edges 89 against which the opposing edges of the vertical slot 87× of the mould bear.

It will of course be understood that the inner face of the bar 88 conforms to the contour of the inner surface of the mould and fills the slots 87×. The bars 88 are secured by bolts 90 to the stationary bars 73 and 74. 91 are bracket lugs secured to the mould at each side of the vertical centre at one side of the slot 87×. 92 are similar lugs secured to the mould 85× at the opposite side of the slot 87×. 93 and 94 are bracket lugs secured to the movable bars 82 and 84. 95 and 96 are bracket lugs secured to the movable bars 81 and 83. The lugs of the brackets 91 and 93 are pivotally connected together by a pivot pin as are also the lugs of the brackets 95 and 96.

It will thus be seen that when the bars 82 and 84 are moved in the direction of arrow and the bars 81 and 83 in the opposite direction of arrow that the free sides of the mould forming the slot 87× are drawn apart, the beveled sides of the filling bar 88 allowing this movement. 98 are cross bolts extending through and between the bars 73 and 75 and between the bars 74 and 76. 99 and 100 are sleeves turnably mounted upon the cross bolts 98. At one end the sleeves 99 and 100 are provided with a cross arm 101. The upper ends of the arms 101 are pivotally connected respectively to the bars 81 and 83 and the lower ends of the cross arms to the bars 82 and 84. 102 and 103 are arms extending outward from the sleeves 99 and 100. 104 is a link connecting the arms 103 and 102 together. 105 is a lever which is mounted upon the pin 106 carried by a lug 107 extending from the end frame 69 of the mould frame. The lever 105 is provided with an angular projection 108. 109 is a gravity locking lever which is swung by a pin 110 at one end upon the bracket 107. The lever 109 is provided at its lower end with an angular notch 111 engaging the projection 108, thereby locking the moulds 85× in the closed position.

I will now describe the construction and operation of the movable plates forming the mould bottom. 112 and 113 are plates extending longitudinally beneath the mould carrier and provided in their opposing edges with semi-circular notches 114 and 115 which together form a circular opening directly beneath the centre of the mould and corresponding in diameter to the interior diameter of the tile formed in the mould 85×. The plates 112 and 113 are secured to bars 116 and 117 provided with inwardly extending ribbed portions 118 and 119 to which the plates 112 and 113 are secured. The ribbed portions at their inner ends are provided with lugs 120 and 121. 122 are intermediate frames extending between the bars 73 and 76 and bars 74 and 75. The upper ends of the frames are provided with laterally extending lug projections 123 and 124. 125 are links depending from the lugs 123 and 124 and pivotally connected at their lower ends to brackets 126 and 127 secured to the bars 116 and 117 of the mould bottom. 128 and 129 are links pivotally connected at their lower ends to the lugs 120 and 121 and inclined outwardly towards their upper ends from each side of the centre of the mould carrier and are pivotally connected at their upper ends at 130 and 131 to the intermediate frame 122.

By this means the mould bottom formed by the plates 112 and 113 is hung so as to swing outwardly from each side of the longitudinal center of the mould carrier. The end intermediate frames are also provided with links 125 to support the mould bottom but in this case these links are provided with inward extensions 132 and 133, (see Fig. 9) provided with intermeshing gear sectors 134 and 135. The link carrying the arm 133 is provided with an outward extension 136. 137 is a lever which is swung upon the opposite end of the pin 106. 138 is a link connecting the lever 137 to the arm extension 136.

It will thus be seen that when each lever 137 is raised upward, by mechanism which I will hereinafter describe, each arm 136 is formed integral with the corresponding arm 133 is also forced upward and carries each link 125 also formed integral with an arm 133 outward in one direction and each link 125 formed integral with an arm 132 in the opposite direction thereby carrying the plates 112 and 113 from beneath the mould by a downward and outward swinging movement. Upon the link 125 at each end of the mould frame formed integral with the arm 133 (see Fig. 9) are mounted locking levers 139 and 140. Each lever 139 is provided with an inwardly extending tongue 141 having a notch 142 engaging the lower edge of the bar 75. Each lever 140 is provided with an inwardly extending tongue 143 having a notch 144 adapted to engage the upper end of the bar 75 when the mould bottoms are swung to their open position, that is to say, away from the bottom of the moulds. Each lever 140 is carried into its engaging position by means of the tension spring 145.

I will now describe means whereby the levers 109 and 105, 137 and 139 are actuated. 146 and 147 are side frames carried by the base frame and connected together by a cross channel bar 148 and an angle bar 149. 150 and 151 are bearing brackets carried by the side frames 146 and 147. 152 is a rocking shaft journalled in the brackets 150 and 151. 153 and 154 are rocker arms each having upturned ends 154$^x$ with which the cam rollers 67 and 68 are adapted to coact. The opposite ends of the arms 153 and 154 are provided with lever contact portions 155. 156 is a rocking arm freely mounted on the rocking shaft 152 and also operated by the roller 67. When the mould frame is lowered, the levers 109, 105, 137, and 139 are carried into close contact with the contact portions 155 of the rock arms 153 and 156 and 154. When the cams 65 and 66 revolve to carry the rollers 67 and 68 into contact with the portion 154$^x$ of the rocker arms 153, 154 and 156, the contact portions 155 of these arms engage the levers 109 and 105, 137 and 139 so as to raise them to perform their operation. 157 is a hopper into which the cement is fed by suitable means such as by a bucket conveyor. The hopper 157 is supported on cross bars 158 and 159 carried by the standards 4 and 5. The bottom edge of the end plates of the hopper are arc shaped and are concentric to the centre of the shafts 161 journalled in the upper portions of the rearward extensions 27 and 28. 160 is a measuring box. 161 are stub shafts journaled on the frames 4 and 5 and on which the box 160 forming the measuring device is supported.

It will be noted on referring particularly to Fig. 11 that the upper and lower portions of the box are arc shaped to conform to the shape of the lower edge of the hopper 157, but slightly spaced apart therefrom. 162 are segments which are swung upon the hubs 163 of the measuring box 160 and are provided at their outer edge with outturned flanges 164 which correspond in shape to the upper portion of the measuring box and on which is secured a plate 165 which is arc shaped in cross section so as to fit when in its normal position against the lower edges of the end plates of the hopper 157 so as to form a bottom therefor. The measuring box 160 is provided with a movable bottom 166. The bottom 166 is adjusted by means of threaded studs 167 extending through such bottom and mounted in lugs 168. The lower end of the threaded studs 167 are provided with beveled gears 169 each meshing with the bevel gear 170 mounted upon the shaft 171. The shaft 171 is journaled in the end walls of the measuring box and is provided at one end with a squared portion 172 by which it may be turned by a crank and other suitable means. 173 is a hanging member swung upon the pin 174 extending from the bracket 175 carried by the hopper 157. Upon the shaft 161 at each end of the measuring box 160 are secured gears 176 each provided with an edge flange 177 having peripheral recessed portions 178 and 179 and 180 are wheels mounted upon the shaft 181 journalled in the standards 4 and 5 each provided with segmental gear portions 181$^x$ and 182. 183 is a gear wheel similar to the gear wheel 176 and also provided with a flange 184 provided with segmental recesses 185 and 186 and mounted upon the shaft 187. The wheel 180 is also provided with face ribs 188 and 189 which extend between the segmental gear portions 181$^x$ and 182 and are so formed as to fit the recesses 178 and 179 of the flange 177 of the gear 176 and the recess 185 and 186 of the flange 184 of the gear 183. 190 is a crank arm secured to the shaft 187. 191 is a link connecting the crank arm 190 with the segment 162.

It will be understood that as the cement is fed into the hopper 157 that the gears 176 and 183 are locked in position by reason of the ribs 188 and 189 fitting against the recessed portions 178 and 186 of such gear wheels preventing them turning. 192 is a sprocket gear mounted upon the shaft 181. 193 is a sprocket gear mounted upon the cam shaft 63. 194 is a sprocket chain connecting the gears 193 and 192. As the gear 192 revolves, the wheel 180 revolves in unison with it carrying the segmental gear portion 182 into engagement with the gear wheel 183 revolving the same and through the medium of the crank 190 and the link 191 throwing the segmental member 162 around its centre thereby carrying the plate 165 from beneath the hopper and allowing the cement in the hopper to fill the measuring box.

As soon as this operation is accomplished the rib 189 enters the recess 185 of the gear 183 locking the gear 183 from turning until it is again engaged by the segmental gear portion 181$^x$ again turning the gear wheel 183 one half revolution and thereby through the medium of the link 191 drawing the arc shaped plate 165 back to its normal position closing the hopper 157.

After this operation is accomplished the segmental gear portion 182 engages the gear 176 so as to impart to it one half revolution turning the measuring box into position to discharge the cement therefrom the material being held in the measuring box by the member 173 forming a closure for the box until it reaches the discharge position. The measuring box is held in the discharge position by the rib 189 until it is again turned another half revolution by the segmental gear portion 181$^x$. The hanging member 173 is provided at each end with an outwardly extending lug 192×. 193 is a bolt rod by which the lugs are connected to the cross frame 6 of the machine. 194 is a charge receiving hopper provided at its lower end with chutes 195× by which the cement is discharged into the moulds 85×. The charge receiving hopper 194 is supported by hook rods 196 which engage the bolt rods 193 and extend at their lower ends through angle bars 195 secured to the hopper 194. The hopper is also supported by being secured to angle bar 197 extending between the standards 4 and 5.

I will now describe the means for receiving the tile as it is discharged from the mould. 198 is a truck mounted on wheels 199 which run upon the rails 2 and 3. It will of course be understood that after each delivery of tiles from the moulds, the truck 198 must be moved forward a sufficient distance to permit of another set of tiles being deposited. 200 is a cam arm secured to the cam shaft 63 and provided with a slot 201. 202 is a roller which is clamped by a bolt 203 in any desired position in the slot 201. 204 is a bar swung upon the standard 5. 205 is a cam plate provided with an arc shaped edge 206 with which the roller 202 engages. 207 is a gear mounted upon the shaft 208 carried by the base frame 1 of the machine. The hub of the gear is provided with a pall and ratchet clutch 209 (see Fig. 16). 210 is a push bar mounted between guiding rollers 211 carried by the bracket 212 and provided at its opposite end with a gear rack 213 resting upon and engaging with the gear 207. 214 is a link connecting the push bar 210 with the lower end of the bar 204.

It will readily be seen that when the push bar is carried in the direction of arrow by means of the roller 202 engaging the plate 205, the gear 207 and the shaft upon which it is secured is turned thereby, but upon the reverse movement of the push bar the gear 207 rotates freely on the shaft 208 by means of the clutch 209. 215 is a channel bar provided with an interior gear 216, the channel bar being mounted upon the axles of the truck supporting wheels 199. 217 is a gear secured to the shaft 208.

It will thus be seen that when the gear 207 is turned that the shaft 208 and gear 217 is turned with it thereby carrying the channel bar 215 and truck to which it is secured with it to a new tile receiving position. In order to return the push bar I provide an adjustable cam bar 218 which is pivoted upon a bracket 219 provided with an arc shaped slot 220. 221 is a bolt extending through the slot 220 into the cam bar 218 to secure it in any desired position so that it may correspond to the position to which the roller 202 is adjusted to make a return movement corresponding to the forward movement.

As the tile is finished it is necessary to discharge any surplus cement from the top of the mould 85× in order to properly finish off the tile. This is accomplished by providing the mould 85× with a slotted notch 222 and the former with discharging wings 223. As the former reaches the notch 222, the surplus cement is discharged by the centrifugal action of the revolving wings 223 through the notch 222. In order to get rid of this surplus cement I provide an inclined spill pan 224 down which the cement is carried falling into the trough 225. The trough 225 is mounted by a bracket 226 in the channel bar 148. 227 is a cam mounted upon the cam shaft 63 and 228 is a lever mounted upon a standard bracket 229 carried by the angle bar 149 and provided at one end with a roller 230 coacting with the cam 227 and at the opposite end with a depending link rod 231. The bracket 226 is provided with a foot 232 one end of which is pivoted at 233 and carried within the channel bar 148, the opposite end being connected by the link rod 231 to the lever 228.

From this it will be seen that upon each revolution of the cam shaft 63, the cam 227 will engage the lever 228 tilting it and thereby through the link 231 tilting the trough 225 so as to discharge the cement laterally from the machine. 234 are bracket projections extending from the main portion of the standards 4 and 5 and with which the levers operating the mould bottom contact when the mould carrier is carried to the raised position so as to force the mould and mould bottom back to their normal position.

Having described the principle parts involved in my invention I will briefly describe the operation of the same. The cement is fed into the hopper 157 and through the medium of the gear sections 182 and connecting gears, the arc shaped plate 165 is swung from beneath the hopper 157 charging the measuring box 160, the plate 165 being again returned. The measuring box as before described is then turned a half revolution so as to discharge the cement into the charge receiving hopper 194 passing therefrom through the chutes 195× into the moulds. The formers as has been before stated revolve continuously and thereby through the medium of the wings 51 gradually pack the cement on the bottom of the mould gradually building up the tile wall around the former. This operation creates a downward pressure upon the mould and mould frame forcing the mould frame downward against the counter weights 23 and 24.

It will readily be understood that as the tile is built up, the cement forming the tile adds weight to the mould carrier counteracting the effect of the counter weights 23 and 24. In order to overcome this I have provided the wheel 31 carrying the counter weight bar 32 and counter weight 33 and the cord 34 connecting the wheel 31 to the counter weights 23.

It will thus be seen that as the counter weights 23 are drawn upward, as the tile within the mould is built up, the weight 33 is carried from the normal or zero position as to leverage to the maximum position or to a position at right angles to the normal position shown in the drawings and it will thus be seen that as the tile is built up the weight 23 increases in its counterweighting effect in proportion to the amount of cement fed into the mould and thereby producing a tile having an even density from top to bottom. This operation continues until the tile is finished. After the tile is built up the wings of the former continue to revolve in contact with the upper end of the tile thereby finishing it off, the surplus cement being discharged through the notch in the upper end of the mould as has been previously described. As soon as the tile is finished the cams 65 and 66 revolving in the direction of arrow engage the rollers 80 forcing the levers 77 and 78 downward and thereby drawing the mould carrier downward away from the formers and into close juxtaposition to the surface of the truck 198. When the mould carrier has reached this position, the rollers 67 and 68 engage the rocker arms 153, 156 one of which engages the locking lever 139 tilting it upon its pivot so as to free the notch 142 from the bar 75. Two of the rocking arms then engage the levers 137 which are thereby forced upward together with the link rocking the arms 136 and swinging the links 125 outward simultaneously through the medium of the gear portions 134 and 135.

By this means the plates 112 and 113 forming the bottom of the mould are carried from beneath the mould and are locked in their outward position by the notch 144 engaging the upper edge of the bar 75. The rocker arm 156 then engages the lever 105 forcing it upward thereby swinging the arms 102 and 103 downward tilting the sleeve 99 and 100 and arms 101 thereby carrying the bars 81 and 83 in one direction and the bars 82 and 84 in the opposite direction and thereby opening out the mould so as to free the tile.

As soon as the moulds and mould frame are freed of the weight of the tiles, the counter weights 23 serve to draw the mould frame back into the position shown in the drawing. After the deposit of the tile the roller 202 engages the cam plate 205 so as to carry the truck forward to a new tile receiving position, the truck mechanism being carried back to its normal position by the roller 202 engaging the cam bar 218 thereby pushing the push bar 210 to its normal position. By opening the mould in the way I have described it absolutely prevents any danger of the tile sticking or becoming cracked in any way due to its improper delivery. It will also be seen that I have devised a machine in which the tile walls are formed of a uniform density and in which the tiles are automatically delivered ready for conveyance to a desired location.

What I claim as my invention is:

1. In a cement tile making machine, the combination with a mould carrier and moulds, means for guiding the mould carrier freely vertically, formers operating within the moulds to force the carrier downward as the tile is built up and counter weights opposing the downward pressure exerted on the mould frame; of normally vertical counterweighed lever bars mounted upon a swingable support, and means operated by the upward travel of the counter weights for drawing the counter weighted lever bars from the vertical to the horizontal position.

2. In a cement tile making machine, the combination with a mould carrier and moulds, mould carrier supporting means, vertical guides in which the carrier supporting means moves, and counter weights opposing the downward movement of the mould carrier and supports, of a wheel, a shaft upon which the wheel is journalled, a weight secured to the wheel and capable of radial adjustment adjacent to the lower portion of the wheel, a cord connected to the upper portion of the wheel and to the counter weights at the opposite end, and an idler wheel beneath which the cord extends.

3. In a cement tile making machine, the combination with the mould carrier, mould carrier supports, vertical guide ways in which the mould carrier supports operate, and counter weights opposing the vertical movement of the mould carrier, of a mould secured within the carrier at one side and provided with a vertical slotted opening on the opposite side, a filler bar carried by the mould carrier and fitting within the slotted opening, and means for automatically drawing the sides of the slotted opening apart when the mould carrier and moulds are brought to the discharged position.

4. In a cement tile making machine, a mould carrier, a mould secured to one side of the carrier and having a slotted opening at its opposite side, of a filler bar also carried by the mould carrier and fitting the slotted opening of the mould, and means for drawing the sides of the mould apart to discharge the tile.

5. In a cement tile making machine, the combination with a mould frame, of a mould secured within the mould frame to one side thereof, and having a vertically slotted opening extending vertically through the mould, bracket lugs secured to the sides of the mould, longitudinally movable bars carried by the mould carrier, bracket lugs carried by the bars and pivotally connected to the bracket lugs of the mould, and means for moving the bars longitudinally to draw the sides of the mould apart.

6. In a cement tile making machine, the combination with the mould carrier, of moulds secured within the carrier at one side thereof and having the other side provided with a slotted opening, a filler bar secured to the mould carrier and filling the slotted opening of the mould and having beveled side edges against which the opposite free edges of the mould normally bear, and means for spreading the sides of the mould apart to discharge the tile.

7. In a cement tile making machine, the combination with the mould carrier, of moulds secured within the carrier at one side thereof and having the other side provided with a slotted opening, a filler bar secured to the mould carrier and filling the slotted opening of the mould and having beveled side edges against which the opposite free edges of the mould normally bear, bracket lugs secured to the moulds adjacent to each free edge, longitudinally movable bars capable of movement in opposite directions, bracket lugs secured to the bar movable in one direction and pivotally secured to the bracket lugs at one side of the slotted mould opening, and bracket lugs secured to the bar movable in the opposite direction and pivotally connected to the bracket lugs located at the opposite side of the slotted mould opening.

8. In a cement tile making machine, a mould carrier capable of vertical movement, moulds secured within the carrier and having slotted openings dividing the walls of the molds, bracket lugs secured to the moulds at each side of the slotted opening, a filler bar fitting each slotted opening, bars slidably supported on the mould carrier to move in opposite directions, a bracket lug secured to each bar, the bracket lugs secured to the bar moving in one direction being connected to the bracket lugs on one side of the slotted opening and the bracket lugs secured to the bar movable in the opposite direction secured to the bracket lugs on the opposite side of the opening, and means for automatically moving the bars at the termination of the downward movement of the mould carrier.

9. In a cement tile making machine, a mould carrier capable of vertical movement, moulds secured within the carrier and having slotted openings dividing the walls of the moulds, bracket lugs secured to the moulds at each side of the slotted opening, a filler bar fitting each slotted opening, bracket lugs extending from the mould at each side of the slotted opening, bars slidably supported on the mould carrier to move in opposite directions, a bracket lug secured to each bar, the bracket lugs secured to the bar moving in one direction being connected to the bracket lugs on one side of the slotted opening and the bracket lugs secured to the bar movable in the opposite direction secured to the bracket lugs on the opposite side of the opening, a rocking sleeve mounted crosswise within the mould carrier having a cross arm pivotally connected to a pair of movable bars, and automatic means for rocking the sleeve as the mould carrier reaches the limit of its downward movement.

10. In a cement tile making machine, a mould carrier capable of vertical movement, cylindrical moulds secured within the carrier and having vertically slotted openings dividing the walls of the moulds, a vertical filler bar carried by the carrier and fitting between the divided portions of each mould, an upper and lower bar capable of longitudinal movement in one direction and an upper and lower bar capable of movement in the opposite direction, connecting means between one side of the mould and the bars movable in one direction, and connecting means between the other side of the mould and bars movable in the opposite direction, and means for moving the bars longitudinally of the mould carrier.

11. In a cement tile making machine, a mould carrier capable of vertical movement, cylindrical moulds secured within the carrier and having vertically slotted openings dividing the walls of the moulds, a vertical filler bar carried by the carrier and fitting between the divided portion of each mould, an upper and lower bar capable of longitudinal movement in one direction and an upper and lower bar capable of movement in the opposite direction, connecting means between one side of the mould and the bars movable in one direction, and connecting means between the other side of the mould and bars movable in the opposite direction, a rocking sleeve mounted between each pair of movable bars, a cross arm extending from each sleeve and connected at its ends to the bars, an arm extending outwardly from each sleeve, a link connecting the arms together, a lever pivotally mounted upon the carrier and to the link, and means for forcing the lever upward at the end of the downward movement of the carrier.

12. In a cement tile making machine, a mould carrier capable of vertical movement, cylindrical moulds secured within the carrier and having vertically slotted openings dividing the walls of the moulds, a vertical filler bar carried by the carrier and fitting between the divided portions of each mould, an upper and lower bar capable of longitudinal movement in one direction and an upper and lower bar capable of movement in the opposite direction, connecting means between one side of the mould and the bars movable in one direction, and connecting means between the other side of the mould and bars movable in the opposite direction, a rocking sleeve mounted between each pair of movable bars, a cross arm extending from each sleeve and connected at its ends to the bars, an arm extending outwardly from each sleeve, a link connecting the arms together, a lever pivotally mounted on the carrier and to the link, means for forcing the lever upward at the end of the downward movement of the carrier, and tripable means automatically released by the downward movement of the carrier for locking the aforesaid lever in a mould closing position.

13. In a cement tile making machine, a mould carrier capable of vertical movement, cylindrical moulds secured within the carrier and having vertically slotted openings dividing the walls of the moulds, a vertical filler bar carried by the carrier and fitting between the divided portions of each mould, an upper and lower bar capable of longitudinal movement in one direction and an upper and lower bar capable of movement in the opposite direction, connecting means between one side of the mould and the bars movable in one direction, and connecting means between the other side of the mould and bars movable in the opposite direction, a rocking sleeve mounted between each pair of movable bars, a cross arm extending from each sleeve and connected at its ends to the bars, an arm extending outwardly from each sleeve, a link connecting the arms together, a lever pivotally mounted on the carrier and to the link, means for forcing the lever upward at the end of the downward movement of the carrier, a supplemental locking lever also pivoted upon the mould frame provided with a notch in its lower edge, and a projection extending from the mould opening and closing lever engaging the notch.

14. In a cement tile making machine, a mould carrier, a cylindrical mould secured within the carrier in a vertical position, a divided bottom extending normally beneath the mould, links connecting the outer and inner edge portions of each member of the bottom to the carrier adapted to give downward and outward movement to such members as they are swung, and means for imparting an outward swing to the members of the divided bottom as the mould frame reaches its lowermost position.

15. In a cement tile making machine, a mould carrier, a cylindrical mould secured within the carrier in a vertical position, a divided bottom extending normally beneath the mould, links connecting the outer and inner edge portions of each member of the bottom to the carrier adapted to give downward and outward movement to such members as they are swung outward, arms extending inward from each of the outer links, intermeshing gear sectors formed integral with the arms, and means coacting with both of the links to swing the members of the divided bottom outward as the mould carrier reaches its final downward position.

16. In a cement tile making machine, a mould carrier a cylindrical mould secured within the carrier in a vertical position, a divided bottom extending normally beneath the mould, links connecting the outer and inner edge portions of each member of the bottom to the carrier adapted to give downward and outward movement to such members as they are swung outward, arms extending inward from each of the outer links, intermeshing gear sectors formed integral with the arms, an outward extension to one of the aforesaid arms, a lever pivotally mounted upon the mould frame, a link connecting the lever to the outwardly extending arm, and means automatically operated for forcing the levers upward as the mould carrier reaches its final downward position.

17. In a cement tile making machine, the combination with a mould carrier capable of vertical movement, a cylindrical mould supported within the carrier in a vertical position, a divided bottom for the mould, automatic means for swinging the divided members of the mould bottom outward as the mould carrier reaches the limit of its downward movement, and means for locking the members of the divided carrier in the inner and outer position.

18. In a cement tile making machine, the combination with a mould carrier capable of vertical movement, cylindrical moulds supported within the carrier in a vertical position, a divided bottom for the mould, link bars supporting the inner and outer edges of the bottom members to the carrier, means for simultaneously swinging the members of the divided bottom outward as the mould carrier reaches the limit of its downward movement, a locking lever carried by the swinging links, and provided with a notch adapted to engage the mould carrier when the members of the divided bottom are beneath the mould, means for automatically operating the lever to disengage as the mould carrier reaches the limit of its downward movement, and a spring operated lever also carried by the swinging links and adapted to engage the mould carrier when the members of the divided bottom are swung clear of the mould.

19. In a cement tile making machine, the combination with the feed hopper, of a movable feed plate forming the bottom of the hopper, a charge receiving box located beneath the hopper, a charge receiving hopper, and means for automatically moving the feed plate from beneath the feed hopper to discharge the cement into the measuring box and for returning the feed plate, and means for then discharging the charge from the feed box into the charge receiving hopper.

20. In a cement tile making machine, the combination with the feed hopper having an arc shaped bottom, an arc shaped feed plate fitting the bottom and moving concentrically thereto, a measuring box rotatably mounted beneath the feed plate and concentrically to the feed plate and hopper bottom, and means for automatically swinging the feed plate from beneath the hopper and returning it at each operation of the machine and for subsequently rotating the feed box to discharge its contents.

21. In a cement tile making machine, the combination with the feed hopper having an arc shaped bottom, of a shaft mounted in bearings concentrically to the bottom of the hopper, swingable members mounted upon the shaft, an arc shaped feed plate carried by such members and fitting the bottom of the hopper, a charge measuring box secured to the shaft the top and bottom portions of which fit the bottom of the hopper, and means for swinging the feed plate to and from its normal position at each operation of the machine and for subsequently rotating the feed box to discharge its contents.

22. In a cement tile making machine, the combination with the feed hopper, of a feed plate located beneath the feed hopper, a charge receiving box located beneath the hopper, means for moving the feed plate to and from its normal position at each operation of the machine, means for discharging the contents from the measuring box, and means for locking the feed plate and box in their normal and discharging positions between each operation.

23. In a cement tile making machine, the combination with the feed hopper having an arc shaped bottom, of a shaft mounted in bearings concentrically therewith, members swung upon the shaft, an arc-shaped feed plate carried by the members and fitting the bottom of the hopper, a measuring box secured to the shaft, a supplemental gear, a shaft upon which the supplemental gear is mounted, a crank arm secured thereto, a link connecting the crank arm and a rocking feed plate supporting member, a wheel mounted upon a suitable shaft and interposed between the gear of the measuring box and the supplemental gear and provided with gear segments adapted to successively engage first the supplemental gear and then the gear of the measuring box to rotate each a half revolution for each successive engagement, means for locking the gears when out of engagement with the segmental gear portions, and means for driving the wheel having the segmental gear portions.

24. In a cement tile making machine, the combination with a measuring box having an arc shaped bottom, of a shaft mounted in bearings concentrically therewith, members swung upon the shaft, an arc-shaped feed plate carried by the members and fitting the bottom of the hopper, a measuring box secured to the shaft, a supplemental gear, a shaft upon which the supplemental gear is mounted, a crank arm secured thereto, a link connecting the crank arm and a rocking feed plate supporting member, a wheel mounted upon a suitable shaft and interposed between the gear of the measuring box and the supplemental gear and provided with gear segments adapted to successively engage first the supplemental gear and then the gear of the charge receiving box to rotate each a half revolution for each successive engagement, segmental face ribs extending from the wheel between each segmental portion and flanges formed on the gear of the measuring box and the supplemental gear and having diametrically opposite recesses adapted to alternately fit the periphery of the face ribs.

25. In a cement tile making machine, the combination with the moulds having rear notches and formers provided with wings adapted to discharge the surplus cement through the said notches, of an inclined spill pan extending from the moulds, a longitudinally tiltable trough carried by the machine, and means for automatically tilting the trough periodically to discharge the surplus cement laterally of the machine.

26. In a cement tile making machine, the combination with the moulds having discharge notches in the walls thereof, and formers provided with wings adapted to discharge the surplus cement through the discharge notches onto the inclined spill pan extending from the moulds and adapted to receive the surplus cement discharged through the notches of a tiltable trough located beneath the lower edge of the spill pan and adapted to receive the cement therefrom, a bracket upon which the trough is supported at one end having a cross arm at the bottom pivotally mounted at one end upon a suitable support, a cam on the cam shaft, a lever pivotally mounted in the bracket support, a cam roller on one end of the lever and a link engaging the opposite end of the lever with the opposite end of the cross arm.

27. In a cement tile making machine, the combination with a movable tile receiving platform and a rack bar and gear for operating the platform of a cam shaft bar mounted to swing at one end in the machine, a cam plate carried by the bar having an arc shaped edge, a slotted arm carried by the cam shaft, and a roller adjustable longitudinally of the slot.

28. In a cement tile making machine, the combination with a movable tile receiving platform and a rack bar and gear for operating the platform, of a cam shaft, a swingable bar mounted at one end in the machine, a cam plate carried by the bar having an arc shaped edge, a slotted arm carried by the cam shaft, and a roller adjustable longitudinally of the slot, and adjustable means operated by the roller for returning the swinging bar to the normal position.

29. In a cement tile making machine, the combination with a movable tile receiving platform and a rack bar and gear for operating the platform, of a cam shaft, a swingable bar mounted at one end in the machine, a cam plate carried by the bar having an arc shaped edge, a slotted arm carried by the cam shaft, a roller adjustable longitudinally of the slot and a cam bar pivoted upon the bracket, and a set screw extending through the slot into the cam bar for adjustably securing it in position.

30. In a cement tile making machine, the combination with feed hopper and charge receiving hopper, of means for automatically feeding a quantity of cement from the feed hopper into the charge receiving hopper at each operation of the machine, and means for regulating the amount of cement fed.

31. In a cement tile making machine, the combination with a feed hopper, of a turnable measuring box, a cut off device for controlling the feed of the cement from the hopper into the box, and means for regulating the size of the containing space of the box to control the amount of cement received.

32. In a cement tile making machine, the combination with a feed hopper and a turnable measuring box, a movable bottom for the box, and means for adjustably regulating the position of the movable bottom within the box.

33. In a cement tile making machine, the combination with a feed hopper, of a turnable measuring box open at the top and bottom and a movable bottom located therein, threaded stems journalled in bearings within the box and on which the movable bottom is carried, and means for simultaneously turning the stems to adjust the bottom in the box.

34. In a cement tile making machine, the combination with a feed hopper, of a turnable measuring box open at the top and bottom and a movable bottom located therein, threaded stems journalled in bearings within the box and on which the movable bottom is carried, means for simultaneously turning the stems to adjust the bottom in the box, a turnable shaft journalled within the end of the box provided with an end adapted to be manually operated, and bevel gears secured to the stems and gears secured to the shaft meshing with the gears of the stems.

WILLIAM GILLARD.